United States Patent
Tanaka et al.

(10) Patent No.: US 8,736,724 B2
(45) Date of Patent: May 27, 2014

(54) IMAGING APPARATUS, METHOD OF PROCESSING CAPTURED IMAGE, AND PROGRAM FOR PROCESSING CAPTURED IMAGE

(71) Applicant: Fujifilm Corporation, Tokyo (JP)

(72) Inventors: Seiji Tanaka, Saitama (JP); Tetsuro Ashida, Saitama (JP); Tomoyuki Kawai, Saitama (JP); Takehiro Kouguchi, Saitama (JP); Hisashi Endo, Saitama (JP)

(73) Assignee: FUJIFILM Corporation, Tokyo (JP)

(*) Notice: Subject to any disclaimer, the term of this patent is extended or adjusted under 35 U.S.C. 154(b) by 33 days.

(21) Appl. No.: 13/656,093

(22) Filed: Oct. 19, 2012

(65) Prior Publication Data

US 2013/0038761 A1   Feb. 14, 2013

Related U.S. Application Data

(63) Continuation of application No. PCT/JP2011/059431, filed on Apr. 15, 2011.

(30) Foreign Application Priority Data

Apr. 20, 2010 (JP) .................. 2010-097367

(51) Int. Cl.
*H04N 9/07* (2006.01)
*H04N 3/14* (2006.01)

(52) U.S. Cl.
USPC .......................................... 348/266; 348/273

(58) Field of Classification Search
USPC ............................ 348/237, 266, 273, 277, 280
See application file for complete search history.

(56) References Cited

U.S. PATENT DOCUMENTS

| 7,362,894 | B2 * | 4/2008 | Ono et al. ..................... 382/167 |
| 7,479,998 | B2 * | 1/2009 | Mitsunaga et al. ........... 348/273 |
| 7,643,074 | B2 * | 1/2010 | Kuno et al. ................... 348/280 |

(Continued)

FOREIGN PATENT DOCUMENTS

| JP | 2004-289728 A | 10/2004 |
| JP | 2006-135468 A | 5/2006 |

(Continued)

OTHER PUBLICATIONS

International Search Report, dated Jun. 21, 2011, Issued in PCT/JP2011/059431.

*Primary Examiner* — Lin Ye
*Assistant Examiner* — Amy Hsu
(74) *Attorney, Agent, or Firm* — Birch, Stewart, Kolasch & Birch, LLP

(57) ABSTRACT

Two kinds of color images, obtained by a solid-state imaging device, having different color tones are combined with each other. A first captured color image due to a first pixel group (pixels in which spectral sensitivities of color filters are wide) of the solid-state imaging device is processed. A second captured color image due to a second pixel group (pixels in which spectral sensitivities of color filters are narrow) is processed. The level difference between captured image signals of the pixels of the first pixel group and captured image signals of the pixels of the second pixel group, and due to the spectral sensitivity difference between the color filters in which the spectral sensitivities are wide and narrow is obtained (steps S1 and S2). The level difference is corrected. The first captured color image and the second captured color image are combined with each other.

20 Claims, 13 Drawing Sheets

(56) References Cited

U.S. PATENT DOCUMENTS

| | | | |
|---|---|---|---|
| 7,847,829 B2 * | 12/2010 | Mitsunaga et al. | 348/222.1 |
| 7,986,360 B2 * | 7/2011 | Mitsunaga et al. | 348/273 |
| 2004/0169747 A1 * | 9/2004 | Ono et al. | 348/272 |
| 2004/0189821 A1 * | 9/2004 | Oda et al. | 348/223.1 |
| 2005/0219390 A1 * | 10/2005 | Tajima et al. | 348/246 |
| 2007/0019087 A1 * | 1/2007 | Kuno et al. | 348/273 |

FOREIGN PATENT DOCUMENTS

| | | | |
|---|---|---|---|
| JP | 2007-209012 A | | 8/2007 |
| JP | 2007209012 A | * | 8/2007 |
| JP | 2009-268078 A | | 11/2009 |

* cited by examiner

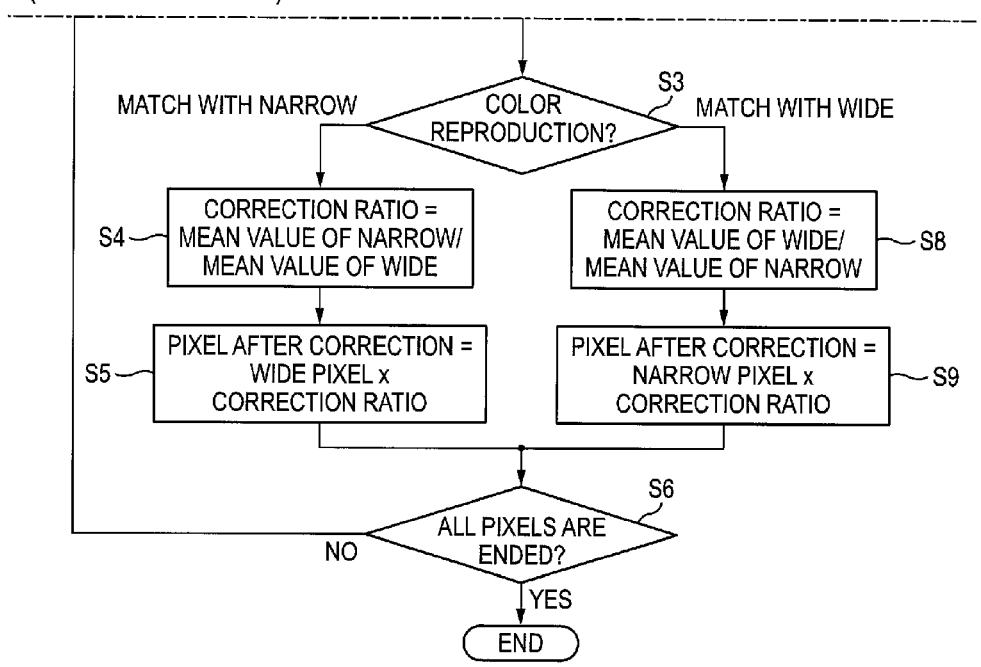

IMAGING APPARATUS, METHOD OF PROCESSING CAPTURED IMAGE, AND PROGRAM FOR PROCESSING CAPTURED IMAGE

This application is a Continuation of PCT/JP2011/059431 filed on Apr. 15, 2011, which claims priority under U.S.C. 119(a) to Patent Application No. 2010-097367 filed in Japan on Apr. 20, 2010, all of which are hereby expressly incorporated by reference into the present application.

TECHNICAL FIELD

The present invention relates to an imaging apparatus equipped with a solid-state imaging device which can capture two kinds of color images having different color tones, a method of processing a captured image, and a program for processing a captured image.

BACKGROUND ART

As an arrangement of color filters mounted in a solid-state imaging device, various arrangements have been proposed and used. For example, an imaging apparatus disclosed in Patent Document 1 below uses a color filter arrangement which is called the Bayer arrangement. In the Bayer arrangement, color filters of any one of the three primary colors of R (red), G (green), and B (blue) are arranged in a mosaic pattern in respective pixels on the basis of a predetermined rule. In a red pixel in which a red filter is mounted, for example, green and blue signals therefore cannot be detected. Consequently, an interpolation calculation is performed on signals of pixels which are in the periphery of the red pixel, and in which green and blue filters are respectively mounted, thereby obtaining the green and blue signals at the position of the red pixel.

In an imaging device disclosed in Patent Document 2 below, each two pixels which are adjacent to each other in an oblique direction are paired, and color filters of one of the three primary colors of RGB are arranged in a mosaic pattern in the unit of paired pixels in accordance with a predetermined rule. For example, a G1 color filter and a G2 color filter are mounted on a pair of pixels on each of which a green filter is mounted, respectively.

The relationship between G1 and G2 is set so that the color of G is attained by, for example, adding them to each other. The color filter of G is produced so that the wavelength of 540 nm is set as the center wavelength, and bell-shaped spectral characteristics having a width of about 100 nm in each of the back and front sides are obtained. By contrast, for example, G1 and G2 are separated in two filters so that the G1 filter detects a color having a wavelength of 440 nm to 540 nm, and the G2 filter detects a wavelength of 540 nm to 640 nm. With respect to the colors of R and B, similarly, R1 and R2 filters are mounted on paired pixels, and B1 and B2 filters are mounted on paired pixels.

When, as described above, colors to be separated by color filters are separated more finely than the case of the three colors of R, G, and B, the color reproducibility of an object image can be improved. However, a captured image taken out from pixels on which the R1, G1, and B1 color filters are mounted, and that taken out from pixels on which the R2, G2, and B2 color filters are mounted are different in color tone from each other. When the images are singly viewed, the images are color images having an unnatural color tone. Therefore, adequate image combination processing must be performed so that an object image having high color reproducibility is obtained by image processing.

In an imaging apparatus disclosed in Patent Document 3 below, each pixel is divided into a small-area portion and a large-area portion. In each of pixels on which, for example, a green (G) filter is mounted, moreover, the thickness of a filter mounted on the small-area portion is made larger than that on the large-area portion, or that of an n-region constituting a photodiode is reduced.

As a result, the small-area portion cannot substantially detect incident light of a certain wavelength region, and the large-area portion can detect light of the wavelength region. By using this, the imaging apparatus detects whether light of the wavelength region exists or not, and determines the kind of the light source.

CITATION LIST

Patent Literature

Patent Document 1: JP-A-2006-135468
Patent Document 2: JP-A-2009-268078
Patent Document 3: JP-A-2004-289728

SUMMARY OF INVENTION

Technical Problem

As a conventional monitor apparatus which can display a color image, a cathode ray tube type monitor apparatus (CRT) is usually used. Recently, however, a liquid crystal display apparatus is widely used as a liquid crystal television receiver. As a result, an ordinary user is accustomed to view, for example, a vivid color image which is different in color tone from a natural color image. Therefore, situations where a color image captured by a digital camera seems not enough are increasing.

The above-described color filters which are used in conventional solid-state imaging devices are invented simply so that a color reproduction of an object image is enabled to have a natural color tone. Therefore, a color image of an object cannot be captured as a vivid color image.

On the other hand, there is also an imaging scene where, a color image of an object must be captured as a vivid color image. A request for an imaging apparatus which can capture both a vivid color image and a natural color image is strong.

It is an object of the invention to provide an imaging apparatus equipped with a solid-state imaging device which can capture two kinds of color images having different color tones, a method of processing a captured image, and a program for processing a captured image.

Solution to Problem

An imaging apparatus of the invention, comprises: a solid-state imaging device including: a plurality of pixels which are arranged and formed in a two-dimensional array in a semiconductor substrate; a plurality of color filters of a first color which are arranged and stacked in accordance with a predetermined rule on a first pixel group that includes one of odd rows and even rows of the pixels; and a plurality of color filters of a second color which are arranged and stacked in accordance with a predetermined rule on a second pixel group that includes the other one of the odd rows and the even rows, the color filters of the second color being different in spectral sensitivity from the plurality of color filters of the first color; and an image process section which obtains a level difference between captured image signals of the pixels of the first pixel group and captured image signals of the pixels of the second pixel group, the level difference being due to a spectral sensitivity difference between the plurality of color filters including the first color and the plurality of color filters including the second color, and which combines a first captured image that is obtained from the first pixel group by correcting the level difference, with a second captured image that is obtained from the second pixel group.

A method of processing a captured image which processes an image captured by a solid-state imaging device of the invention comprises: a plurality of pixels which are arranged and formed in a two-dimensional array in a semiconductor substrate; a plurality of color filters of a first color which are arranged and stacked in accordance with a predetermined rule on a first pixel group that includes one of odd rows and even rows of the pixels; and a plurality of color filters of a second color which are arranged and stacked in accordance with a predetermined rule on a second pixel group that includes the other one of the odd rows and the even rows, the color filters of the second color being different in spectral sensitivity from the plurality of color filters of the first color, in which, the method comprise: obtaining a level difference between captured image signals of the pixels of the first pixel group and captured image signals of the pixels of the second pixel group, the level difference being due to a spectral sensitivity difference between the plurality of color filters including the first color and the plurality of color filters including the second color; correcting the level difference; and combining a first captured image that is obtained from the first pixel group, and a second captured image that is obtained from the second pixel group with each other.

A program for processing a captured image which process an image captured by the solid-state imaging device of the invention is provided with a step of executing the method of processing a captured image.

Advantageous Effects of Invention

According to the invention, it is possible to capture two kinds of color images having different color tones (for example, a natural color image and a vivid color image), and also to obtain an image which is a combination of the two color images.

DESCRIPTION OF EMBODIMENTS

Hereinafter, an embodiment of the invention will be described with reference to the drawings.

Figure 1:
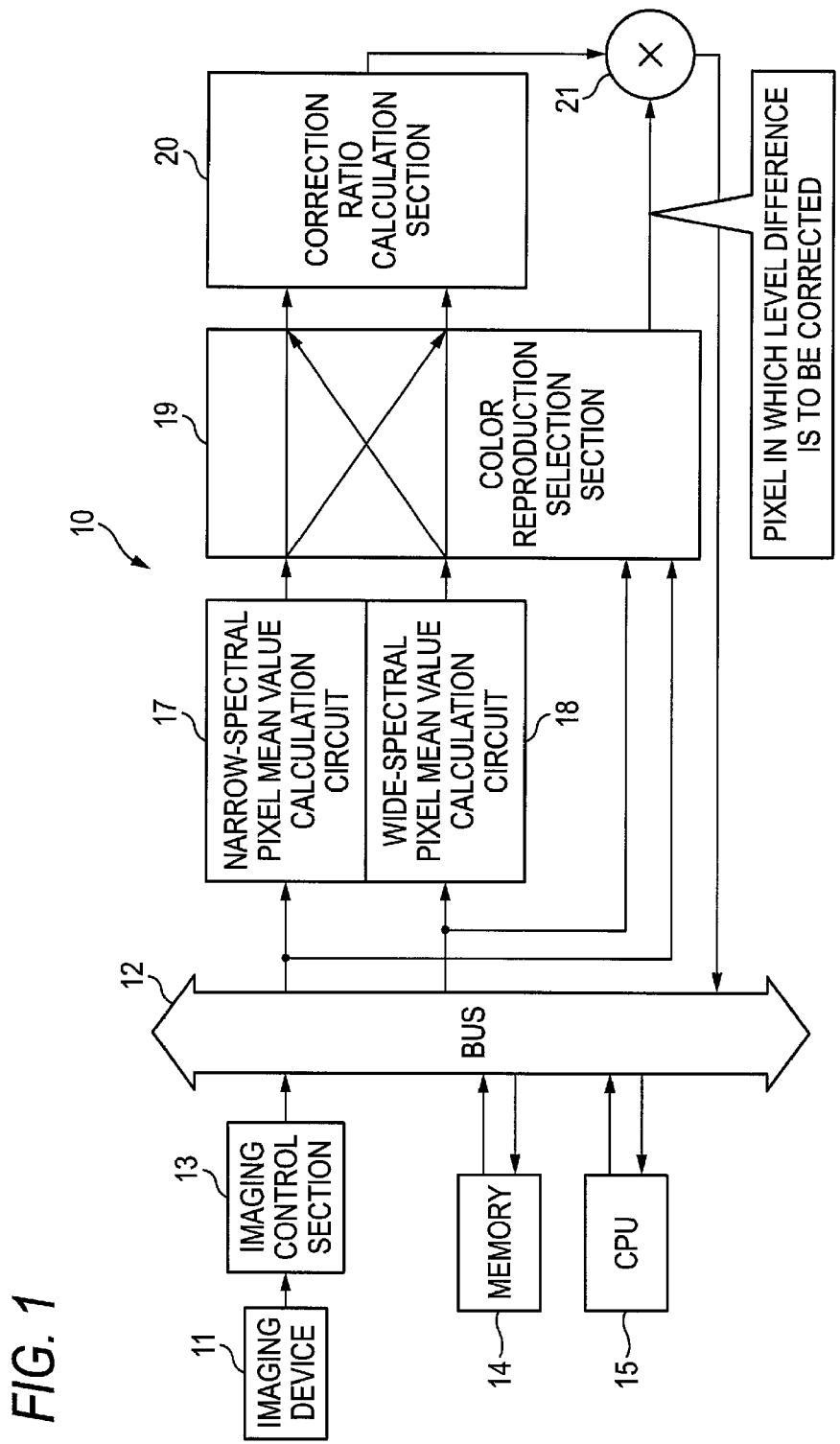
FIG. 1 is a functional block diagram of an imaging apparatus of a first embodiment of the invention.

FIG. 1 is a functional block diagram of an imaging apparatus of a first embodiment of the invention. The imaging apparatus 10 includes a solid-state imaging device 11, an imaging control section 13, a memory 14, and a CPU 15. The imaging control section 13 drives and controls the solid-state imaging device 11. Furthermore, the imaging control section 13 receives a captured image signal output from the solid-state imaging device 11, performs a correlated double sampling process, a gain control process, and an A/D (analogdigital) conversion process, and outputs the resulting signal to a bus 12. The memory 14 is connected to the bus 12. The CPU 15 generally controls the whole imaging apparatus 10. The CPU 15 incorporates a DSP function, and performs a correction process (an offset process, a gamma correction process, an RGB/YC conversion process, a concurrent process, and the like) on the captured image signal output from the solid-state imaging device 11, to produce an object image.

The imaging apparatus 10 further includes a narrow-spectral pixel mean value calculation circuit 17, a wide-spectral pixel mean value calculation circuit 18, a color reproduction selection section 19, a correction ratio calculation section 20, and a multiplier 21. The narrow-spectral pixel mean value calculation circuit 17 and the wide-spectral pixel mean value calculation circuit 18 process the digital captured image signal received from the bus 12. The color reproduction selection section 19 selectively controls the outputs of the calculation circuits 17, 18 and digital captured image signals received from the bus 12, and performs color reproduction. The correction ratio calculation section 20 calculates a correction ratio from the output signal of the calculation circuit 17 or 18 which is selected by the color reproduction selection section 19. The multiplier 21 multiplies a signal of a pixel which is selected by the color reproduction selection section 19 in accordance with the digital captured image signals received from the bus 12, and in which the level difference is to be corrected, by an output signal of the correction ratio calculation section 20, and returns the product to the bus 12.

The calculation circuits 17, 18, the color reproduction selection section 19, the correction ratio calculation section 20, and the multiplier 21 constitute a part of an image process section. Its operation will be described in detail later.

Figure 2:
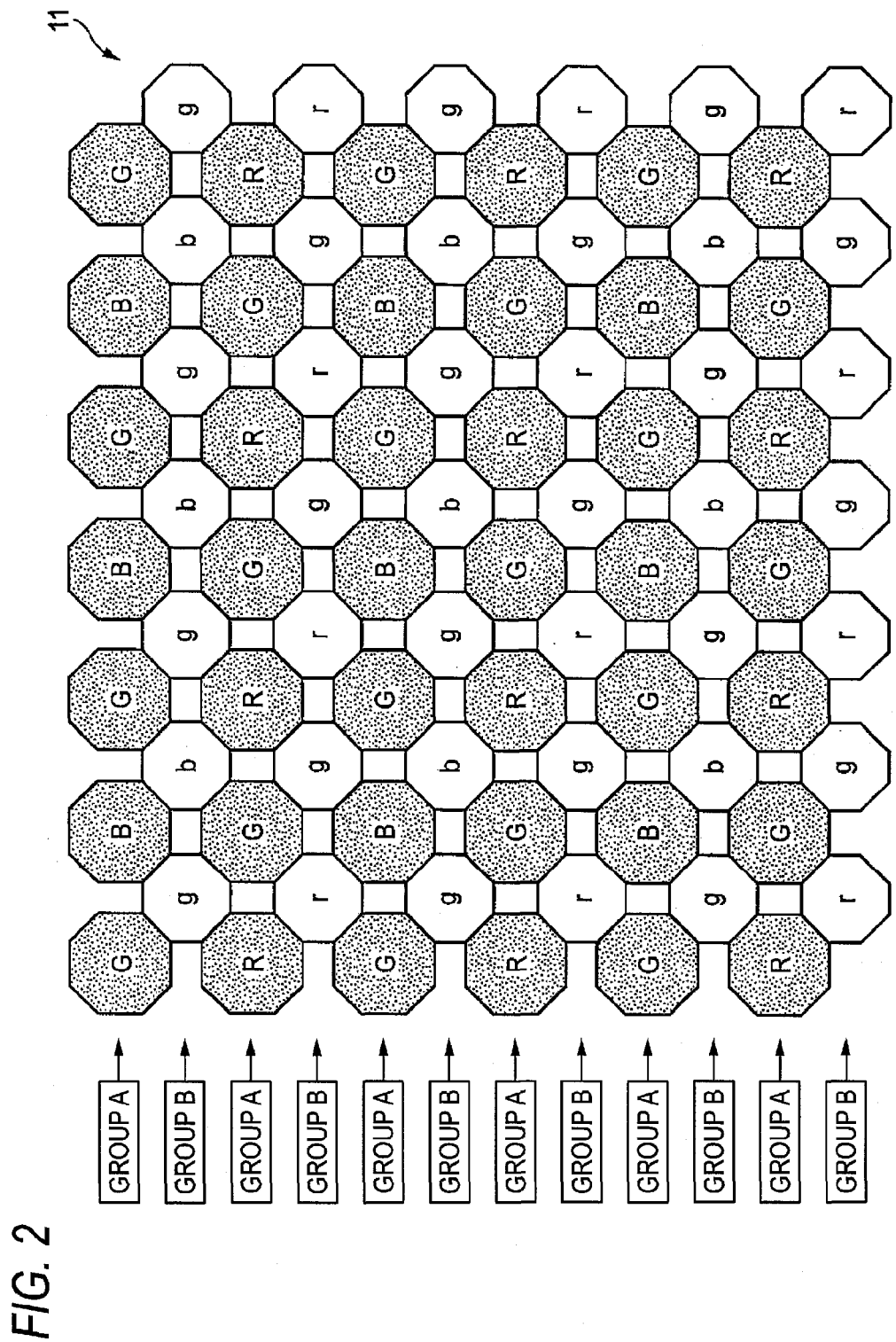
FIG. 2 is a view of a color filter arrangement in a solid-state imaging device shown in FIG. 1.

FIG. 2 is a surface diagram of the solid-state imaging device 11. In the solid-state imaging device 11 in the embodiment, a plurality of pixels (photodiodes) having the same light receiving area are arranged and formed in a two-dimensional array in a semiconductor substrate. The even pixel rows are arranged to be shifted by ½ pixel pitch with respect to the odd pixel rows. When only the arrangement of the pixels of the odd rows is considered, the pixels constitute a square lattice arrangement. When only the arrangement of the pixels of the even rows is considered, the pixels constitute a square lattice arrangement. Color filters R, G, B of the three primary colors are Bayer-arranged in the pixels (A-group pixels) of the odd rows, and color filters r, g, b of the three primary colors are Bayer-arranged in the pixels (B-group pixels) of the even rows.

Although not illustrated, a signal readout section which reads out captured image signals detected by the pixels to the outside is formed in the surface portion of the semiconductor substrate. In the case where the solid-state imaging device is of the CCD type, as disclosed in, for example, JP-A-2005-72966, the signal readout section may be configured by vertical charge transfer paths, a horizontal charge transfer path, and an amplifier which outputs a voltage value signal corresponding to the amount of signal charges as a captured image signal. In the case where the solid-state imaging device is of the CMOS type, as disclosed in, for example, JP-A-2007-124137 and JP-A-2007-81140, the signal readout section may be configured by MOS transistors, a vertical scan circuit, a horizontal circuit, etc.

Figure 3:
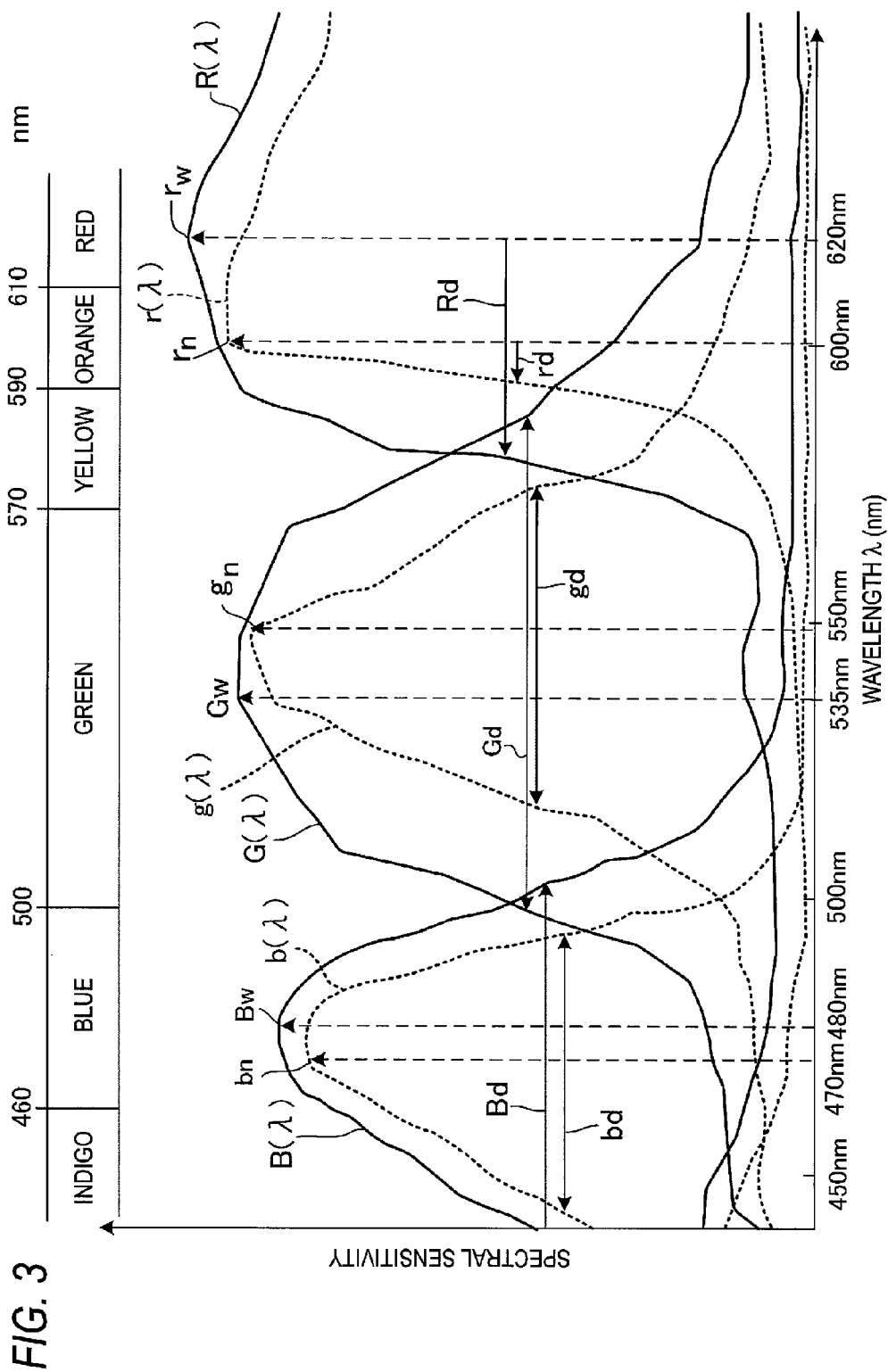
FIG. 3 is a view showing spectral sensitivities of color filters used in the color filter arrangement shown in FIG. 2.

FIG. 3 is a graph showing spectral sensitivities of the color filters RGB and rgb. The wavelength of light is represented by λ. The spectral sensitivity of each of the red color filters R(λ), green color filters G(λ), and blue color filters B(λ) which are stacked on the A-group pixels has a bell-like mountain shape and a large width (hereinafter, this situation is referred to as wide).

By contrast, although the spectral sensitivity of each of the red color filters r(λ), green color filters g(λ), and blue color filters b(λ) which are stacked on the B-group pixels has a bell-like mountain shape, it has a small width ((hereinafter, this situation is referred to as narrow).

The graph of FIG. 3 shows the spectral sensitivities of light of various wavelengths. As described with reference to FIG. 2, the A- and B-group pixels have the same light receiving area. Therefore, the graph of FIG. 3 shows the wavelength dependency of the amount of received light which has passed through the color filter of each pixel.

It is difficult that light on the long wavelength side (infrared region) of a red color filter is cut off only by a color filter. Usually, therefore, an infrared cut filter is inserted in an imaging lens system of a digital camera. The graph of FIG. 3 shows characteristics in the case where only red color filters R or r in which an infrared cut filter is not inserted are used.

In an upper end portion of FIG. 3, relationships between the value of the wavelength λ (nm) and a color. The wide red filters R which are to be stacked on the A-group pixels are produced actually as filters that allow orange light to pass therethrough, and also part of yellow light to pass therethrough. The green filters G are produced as filters that, on the long wavelength side of them, allow part of yellow and orange light to pass therethrough. The same applies to the short wavelength side. Wide green filters G are produced as filters that allow part of blue light to pass therethrough, and wide blue filters B are produced as filters that allow part of green light to pass therethrough.

Namely, both the pixels on which the G filters are mounted, and those on which the R filters are mounted receive orange and yellow light, and both the pixels on which the G filters are mounted, and those on which the B filters are mounted receive part of light in vicinity of the boundary of blue and green.

In the case where an object color image is reproduced based on detection signals of the pixels on which the G filters are mounted, those of the pixels on which the R filters are mounted, and those of the pixels on which the B filters are mounted, the larger the overlapping portions of the detection signals (in the above, the boundary portion of orange and yellow, and that of blue and green), the larger rate at which green and red, and green and blue are mixed in the reproduced color image.

Namely, color signals R, G, B which are obtained through wide filters R, G, B are color signals which contain not only the respective original colors of red, green, and blue but also other colors, and in which the mixture fraction (mixture ratio) of the original color is low. At a mixture ratio where the degree of mixture with other colors is adequate, however, a natural color image is obtained.

By contrast, the smaller the overlapping portions, the higher the mixture fraction (mixture ratio) of the original color the signals have. Namely, color signals r, g, b which are obtained through narrow filters r, g, b are color signals in which the mixture fraction (mixture ratio) of the original color is high. A color image which is reproduced based on the color signals r, g, b is a vivid color image.

Colors in a certain wavelength range are not identical, but are gradually changed. In the wavelength range of 500 nm to 570 nm of FIG. 3, for example, all colors are illustrated as "green". But, actually, colors in which the mixture ratio of blue is gradually increased as further advancing toward the left side of FIG. 3 are obtained, and those in which the mixture ratio of yellow is gradually increased as further advancing toward the right side of FIG. 3 are obtained. In the above, "original color" in the case of, for example, green does not mean colors in the whole range of 500 nm to 570 nm, but means colors in a part of the range, for example, a predetermined wavelength range (for example, ±25 nm) which is centered at 535 nm.

In the solid-state imaging device 11 which is to be mounted in the imaging apparatus of the embodiment, the wide color filters R, G, B are stacked on the A-group pixels, so that a natural color image of an object can be captured, and the narrow color filters r, g, b are stacked on the B-group pixels, so that a vivid color image of the object can be captured.

As the wide color filters R, G, B, color filter materials which conventionally exist, and which allow a natural color image to be captured are used. In contrast to the wide color filter materials, the filters r, g, b having the spectral characteristics exemplarily shown in FIG. 3 are produced by pigments or dyes which are different from materials for a wide color filter.

In this case, when the thickness of the wide color filters R, G, B is different from that of the narrow color filters r, g, b, unevenness is formed on the surface of the solid-state imaging device 11, and steps of stacking a microlens thereon are complicated. In order to facilitate the production to reduce the production cost, therefore, the wide color filters R, G, B and the narrow color filters r, g, b preferably have the same thickness.

Preferably, the peak sensitivity values of the filters R, G, B are set to be approximately equal respectively to those of the filters r, g, b so that the brightness of a natural color image captured by the A-group pixels is substantially equal to that of a vivid color image captured by the B-group pixels.

In the example of FIG. 3, in the case where the error between the peak sensitivity value Bw of the blue filter G and the peak sensitivity value bn of the blue filter b is within 10%, it is deemed that the peak sensitivity value of the blue filter G is equal to the sensitivity value of the blue filter b. In the case where the error between the peak sensitivity value Gw of the green filter G and the peak sensitivity value bn of the green filter g is within 10%, it is deemed that the peak sensitivity value of the green filter G is equal to that of the green filter g. In the case where the error between the peak sensitivity value Rw of the red filter R and the peak sensitivity value m of the red filter r is within 10%, furthermore, it is deemed that the peak sensitivity value of the red filter R is equal to that of the red filter r.

Preferably, the wavelength $\lambda_{BW}$ of light providing the peak sensitivity value Bw of blue light is identical with the wavelength $\lambda_{bn}$ of light providing the peak sensitivity value bn. Actually, however, the materials forming the filter B are different from those forming the filter b, and therefore it is difficult to make the wavelength $\lambda_{BW}$ identical with the wavelength $\lambda_{bn}$. However, the error between the wavelength $\lambda_{BW}$ and the wavelength $\lambda_{bn}$ may be within the range of about ±20 nm. This is similarly applicable also to the other colors.

The wavelength range of the spectral sensitivity of the narrow red filter r is completely inside that of the spectral sensitivity of the wide red filter R. This is similarly applicable also to the other colors (green and blue). In the wavelength range (about 380 nm to 650 nm) of visible light, namely, $R(\lambda) > r(\lambda)$, $G(\lambda) > g(\lambda)$, and $B(\lambda) > b(\lambda)$ are set This is because a color image captured through the wide filters R, G, B is a natural color image, but a color image captured at spectral sensitivities which are deviated from the wavelength ranges of the spectral sensitivities of the filters R, G, B is a color image having an unnatural color tone. When the wavelength range of the spectral sensitivity of the narrow filter r (g, b) is completely inside that of the spectral sensitivity of the wide filter R (G, B), a color image captured through the narrow filters r, g, b is a vivid color image but not an image having an unnatural color tone.

In the case where the wavelength range of the spectral sensitivity of the narrow green filter g is set to be inside that of the spectral sensitivity of the wide green filter G, it is preferable that the spectral sensitivity of the narrow green filter g is separated by an equal distance from the right and left edge lines of the mountain shape of the spectral sensitivity of the wide green filter G. However, the materials of the filter g are different from those of the filter G. Therefore, the above is not essential, and the spectral sensitivity of the narrow green filter g may be slightly shifted to one side.

As described above, the mixture ratio (content ratio) of the original color contained in transmitted light from the narrow color filters r, g, b is higher than the mixture ratio (content ratio) of the original color contained in transmitted light from the wide color filters R, G, B. Next, this will be quantitatively described.

When the mixture ratio of the original color in the wide color filters R, G, B is indicated by $\alpha$, and the mixture ratio of the original color in the narrow color filters r, g, b is indicated by $\alpha + \Delta\alpha$, it is preferable to set $\Delta\alpha > 0$. According to this, it is possible that an image captured through the narrow color filters r, g, b can be viewed as being visually vivid.

It is subjectively determined whether an image is vivid or not. Therefore, the degree of the difference $\Delta\alpha$ is hardly quantified. In the embodiment, the mixture ratio $\alpha$ is defined in the following manner. Referring to FIG. 3, the half-value width Bd with respect to the peak sensitivity value Bw of the blue color filter B is obtained, and the half-value width bd with respect to the peak sensitivity value bn of the blue color filter b is obtained. Then, the mixture ratio (content ratio) of the original color contained in transmitted light from the wide color filter B is defined as Bd/Bw, and the mixture ratio (content ratio) of the original color contained in transmitted light from the narrow color filter b is defined as bd/bn. At this time, the spectral sensitivity of the narrow color filter b is determined so as to attain:

$$bd/bn < Bd/Bw.$$

When $\Delta\alpha$ above is used in the expression, the spectral sensitivity of the narrow color filter b is determined so as to attain:

$$bd/bn + \Delta\alpha = Bd/Bw.$$

In the measurement values of the example of FIG. 3, bd/bn=53.75(%) and Bd/Bw=64.7(%). Therefore, $\Delta\alpha$=about 10(%).

With respect to green, similarly, the spectral sensitivity of the narrow color filter g is determined so as to attain:

$$gd/gn < Gd/Bw.$$

When $\Delta\alpha$ above is used in the expression, the spectral sensitivity of the narrow color filter g is determined so as to attain:

$$gd/gn + \Delta\alpha = Gd/Gw.$$

In the measurement values of the example of FIG. 3, gd/gn=63.75(%) and Gd/Gw=95.12(%). Therefore, $\Delta\alpha$=about 31(%).

With respect to red, as described above, the long wavelength side is cut off by the infrared cut filter. Therefore, the determination is performed by using only the short wavelength side of the position of the peak sensitivity.

The spectral sensitivity of the narrow color filter r is determined so as to attain:

$$rd/rn < Rd/Rw.$$

When $\Delta\alpha$ above is used in the expression, the spectral sensitivity of the narrow color filter r is determined so as to attain:

$$rd/rn + \Delta\alpha = Rd/Rw.$$

In the measurement values of the example of FIG. 3, rd/rn=7.5(%) and Rd/Rw=34(%). Therefore, $\Delta\alpha$=about 26(%).

When, as described above, the content ratio of the original color contained in transmitted light from the narrow color filters r, g, b is made higher than that of the original color contained in transmitted light from the wide color filters R, G, B, the single solid-state imaging device 11 can simultaneously capture two object images (a natural color image obtained from the A-group pixels, and a vivid color image obtained from the B-group pixels). In the embodiment, a color within the wavelength range of the half-value width of each of the spectral sensitivities of the narrow color filters r, g, b is set as "original color", so that the content ratios of the original color are made higher than those of the wide color filters R, G, B.

As described above, the solid-state imaging device 11 having the configuration of FIG. 2 can simultaneously capture two color images. However, each of the captured images is a captured image which uses ½ of the number of the pixels mounted in the solid-state imaging device 11, and there is also a request to capture a high-definition object image which uses all the pixels. However, the A-group pixels and the B-group pixels have the color filters of different spectral sensitivities, and therefore a level difference (sensitivity ratio) is produced between the captured images. Even when a high-definition image is obtained by simply combining the captured images with each other, the high-definition image is an image giving a feeling of strangeness.

In the following embodiments, therefore, a method of processing a captured image will be described in which a high-definition image that does not give a feeling of strangeness is produced from signals of an object color image having a natural color tone, and those of an object color image having a vivid color tone.

When the A-group pixels and the B-group pixels are different in spectral sensitivity from each other, different pixel values are obtained with respect to the same color contained in the subject to be captured (object), and a level difference is produced. As seen from FIG. 3, moreover, the level difference between the A-group pixels and the B-group pixels is different depending on respective colors (wavelengths) in the visible light region. Therefore, a highly accurate correction cannot be performed by a process in which the whole screen is uniformly processed, such as the gain process, and local optimization is required.

In the following embodiments, therefore, the level difference is corrected in the following manner. The mean value calculation circuits 17, 18 in FIG. 1 calculate mean values (for example, a mean value of neighboring 5×5 pixels of the same color as a to-be-corrected pixel) of same-color pixels (R and r, G and g, and B and b) for each spectral sensitivity. The correction ratio calculation section 20 calculates a ratio of the mean value of the spectral (assumed to be the wide side) selected by the color reproduction selection section 19, and the other mean value (the narrow side). Then, the multiplier 21 multiples the detection signal of a pixel which is not selected, and in which the level difference is to be corrected, by the ratio calculated by the correction ratio calculation section 20.

The color reproduction selection section 19 is used for selecting whether the color reproduction is set to a vivid color on the narrow side or a natural color on the wide side. In the case of landscape imaging, for example, the narrow side is selected, and, in the case of person imaging, the wide side is selected.

When two kinds of color filters having different spectral sensitivities or narrow and wide are used as described above, it is possible to select either of two kinds of color reproductions. When the level of the spectral sensitivity of the unselected color reproduction is corrected to match with that of the selected other color reproduction, moreover, RGB (rgb) can be interpolated by using both the A-group pixels and the B-group pixels, and a high-resolution object image can be produced.

Figure 4:
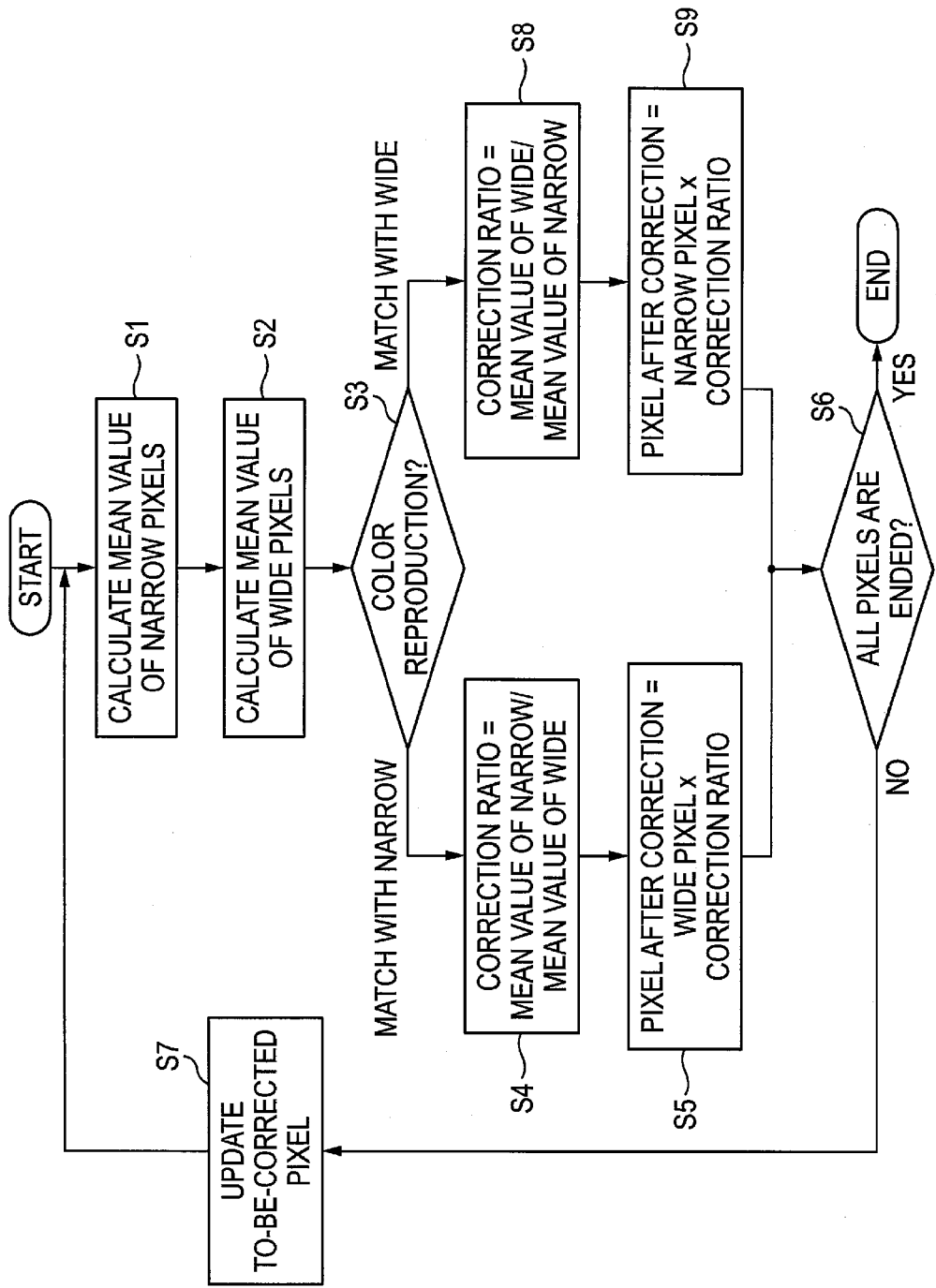
FIG. 4 is a flowchart showing the procedure of captured image processing in the first embodiment of the invention.

FIG. 4 is a flowchart showing the procedure of a processing program for a method of processing a captured image of the first embodiment of the invention. When the user selects a vivid color image, or when an imaging scene is set to the landscape imaging, captured image signals of the B-group pixels on which the narrow filters r, g, b are stacked can be used as they are, and therefore the to-be-corrected pixels are set to the A-group pixels (pixels on which the wide filters R, G, B are stacked).

First, the mean value of captured image signals of a predetermined number of pixels in the periphery of a to-be-corrected pixel, for example, 5×5 same-color pixels which are in the vicinity of the to-be-corrected pixel, and which are on the narrow side is calculated (step S1). Next, the mean value of captured image signals of 5×5 same-color pixels which are in the periphery of the to-be-corrected pixel, and which are on the wide side is calculated (step S2).

In step S3, it is determined whether the color reproduction is on the narrow side or on the wide side. In the example, the color reproduction is performed on the narrow side as described above, and therefore the process advances from step S3 to step S4 to set [mean value obtained in step S1]/[mean value obtained in step S2]=correction ratio.

In next step S5, the value of the captured image signal of the to-be-corrected pixel (in the example, the pixel on the wide side) is multiplied by the correction ratio calculated in step S4, and the level difference (sensitivity ratio) is corrected so as to have the same level as that of the narrow pixel.

In step S6, it is determined whether the correction is ended with respect to all of to-be-corrected pixels or not. If the correction is not ended, the process proceeds to step S7 to change the to-be-corrected pixel to the next to-be-corrected pixel, and returns to step S1.

When the user selects a natural color image, or when an imaging scene is set to the person imaging, captured image signals of the A-group pixels on which the wide filters R, G, B are stacked can be used as they are, and therefore the to-be-corrected pixels are set to the B-group pixels (pixels on which the narrow filters r, g, b are stacked).

In this case, the process proceeds to step S1, step S2, and step S3, the wide side is selected in the determination of step S3, and the process further proceeds to step S8. In step S8, correction ratio=[mean value obtained in step S2]/[mean value obtained in step S1] is calculated. In next step S9, the value of the captured image signal of the to-be-corrected pixel (in the example, the pixel on the narrow side) is multiplied by the correction ratio calculated in step S8, and the level difference is corrected so as to have the same level as that of the wide pixel.

After step S9, the process proceeds to step S6 to determine whether the correction process is ended with respect to all of to-be-corrected pixels or not. If the correction process with respect to all of to-be-corrected pixels is ended, the process is terminated.

After the correction process of FIG. 4 is ended, a process of combining the captured image due to the A-group pixels with that due to the B-group pixels (of course, the captured image due to one of the pixel groups is a corrected captured image) is executed. This is similarly applicable also to the following embodiments.

Figure 5:
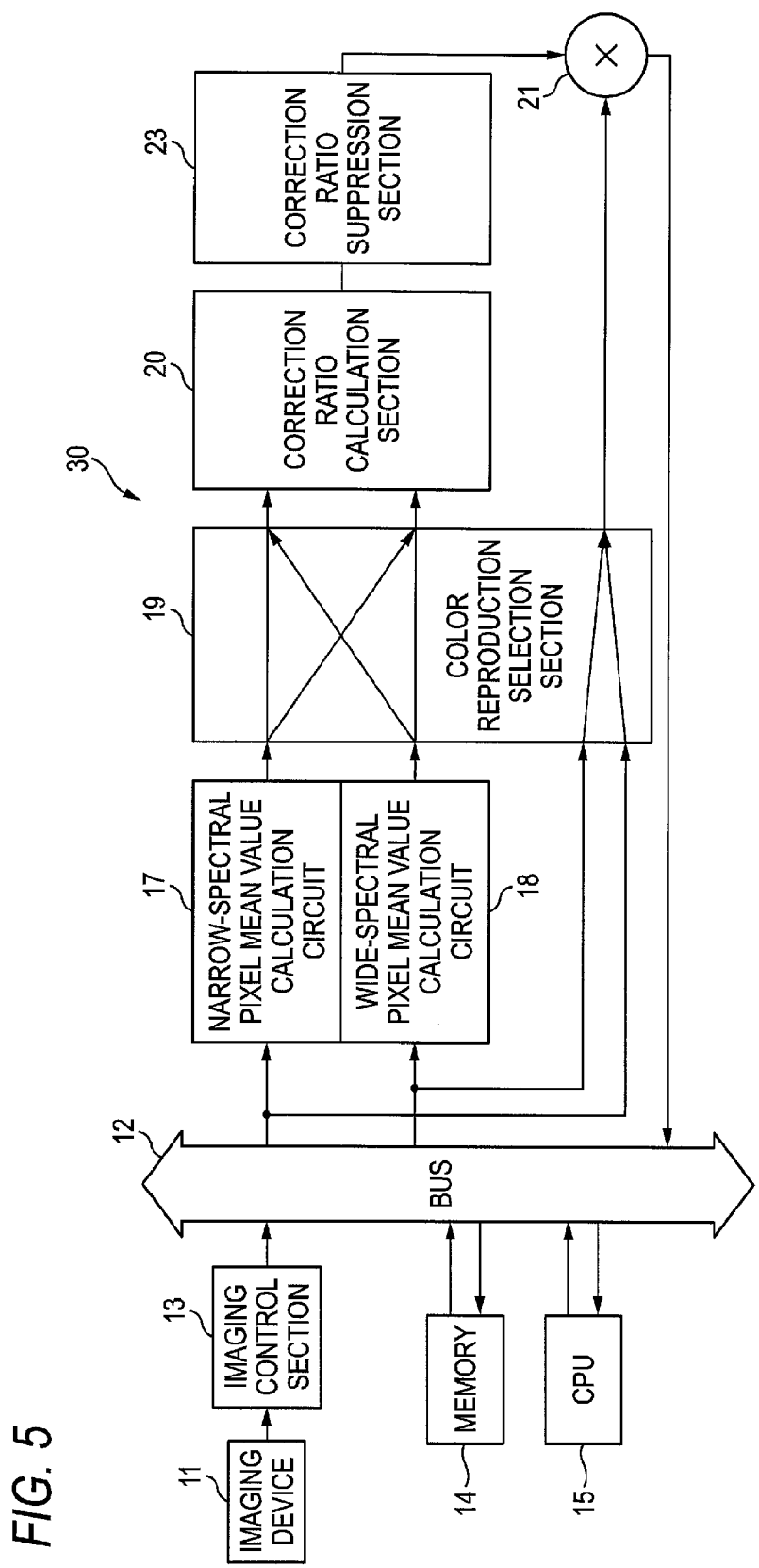
FIG. 5 is a functional block diagram of an imaging apparatus of a second embodiment of the invention.

FIG. 5 is a functional block diagram of an imaging apparatus 30 of a second embodiment of the invention. The second embodiment is different from the first embodiment shown in FIG. 1 in that a correction ratio suppression section 23 is disposed in rear of the correction ratio calculation section 20 and in front of the multiplier 21, and identical with the first embodiment in the other points. The correction ratio suppression section 23 previously sets an upper limit value (for example, the spectral sensitivity ratio of the same color) with respect to a correction ratio, and, when the correction ratio calculated by the correction ratio calculation section 20 exceeds the upper limit value (upper limit correction ratio), performs a suppression process in which the correction ratio is replaced with the upper limit correction ratio, and the resulting correction ratio is output to the multiplier 21.

Figure 6:
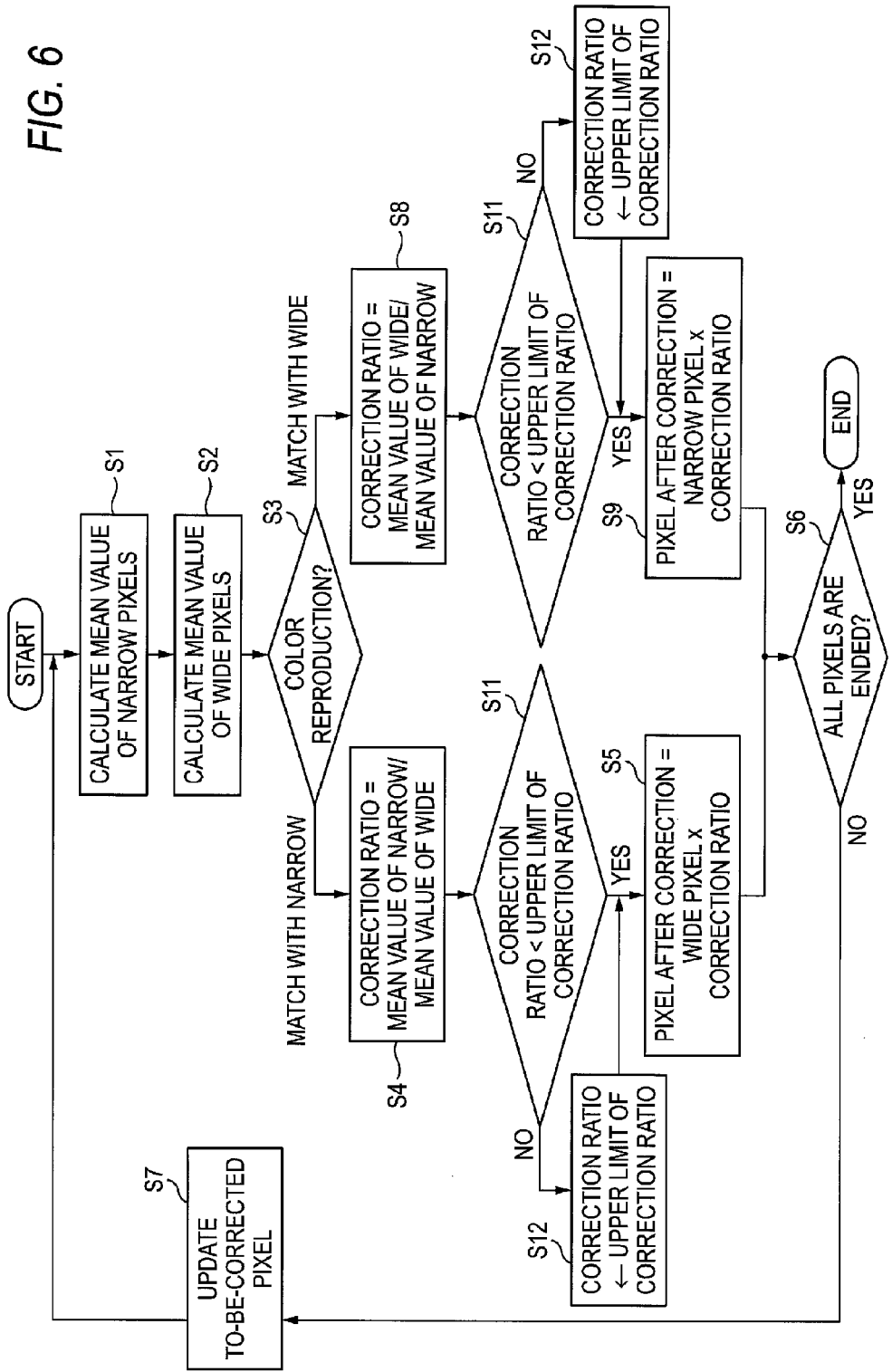
FIG. 6 is a flowchart showing the procedure of captured image processing in the second embodiment of the invention.

FIG. 6 is a flowchart showing the procedure of captured image processing which is executed by the imaging apparatus 30 of the second embodiment. Steps which are identical with those of the flowchart of FIG. 4 are denoted by the same step numbers, and their detailed description is omitted. Only different points will be described.

In the embodiment, as compared with the flowchart of FIG. 4, steps S11 and S12 are disposed between step S4 and step S5, and steps S11 and S12 are disposed also between step S8 and step S9.

In step S11, it is determined whether the correction ratio calculated in step S4 or step S8 is smaller than the upper limit correction ratio or not. If the calculated correction ratio is smaller than the upper limit correction ratio (the determination result is Yes), the process proceeds to step S5 or step S9 to perform correction by using the calculated correction ratio. If the result of the determination of step S11 is negative (No), i.e., if the correction ratio calculated in step S4 or step S8 exceeds the upper limit correction ratio, the process proceeds to step S12 to replace the correction ratio with the upper limit correction ratio, and then to step S5 or step S9.

According to the embodiment, the correction ratio is suppressed, and therefore it is possible to suppress resolution reduction caused by overcorrection in the case of capturing a scene containing high-frequency components.

Figure 7:
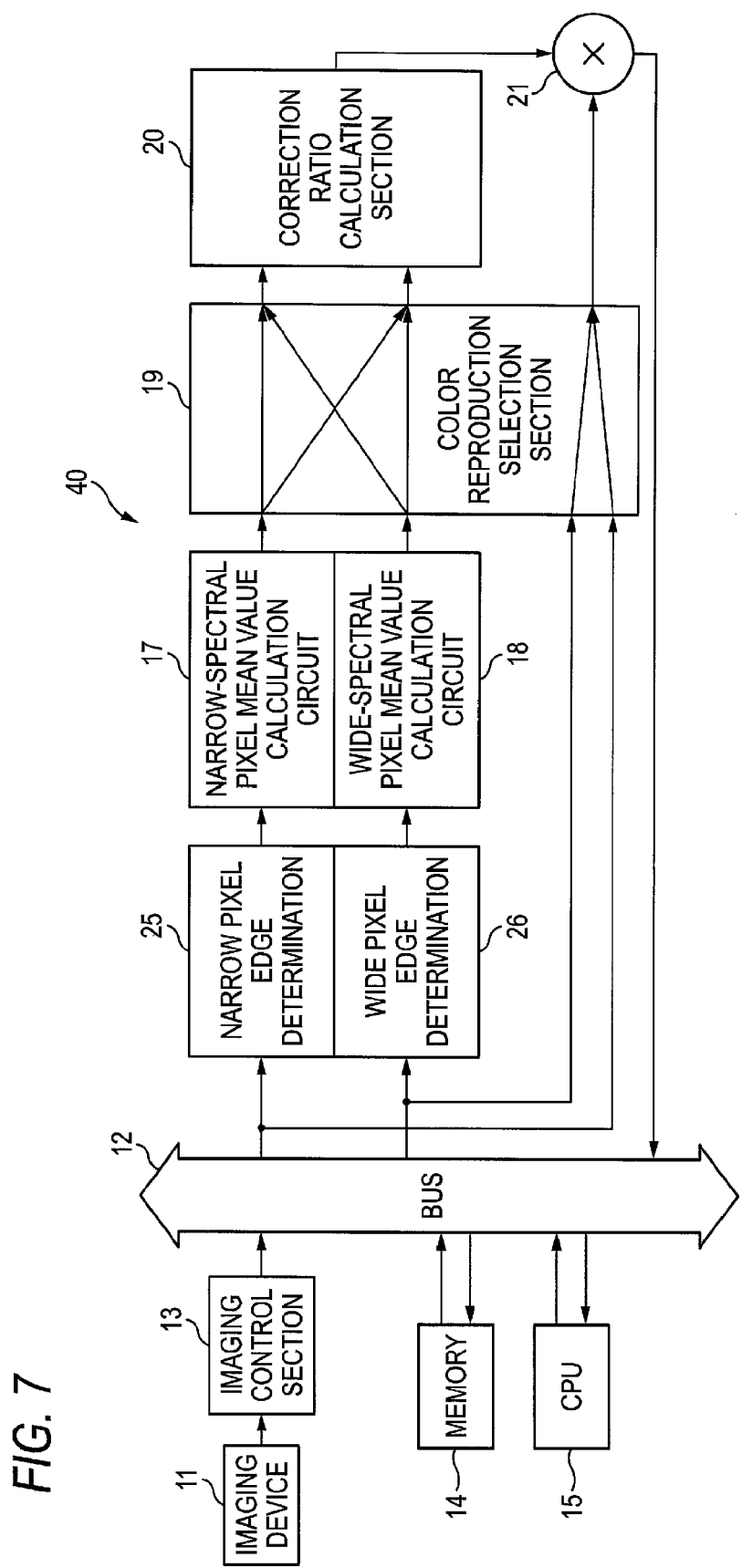
FIG. 7 is a functional block diagram of an imaging apparatus of a third embodiment of the invention.

FIG. 7 is a functional block diagram of an imaging apparatus 40 of a third embodiment of the invention. The imaging apparatus 40 of the embodiment is different from the imaging apparatus 10 of the first embodiment shown in FIG. 1 in that an edge determination section 25 is disposed in front of the mean value calculation circuit 17, and an edge determination section 26 is disposed in front of the mean value calculation circuit 18, and identical with the first embodiment in the other configuration. The edge determination section 25 determines whether an edge exists in the captured image due to the narrow pixels (B-group pixels) or not. The edge determination section 26 determines whether an edge exists in the captured image due to the wide pixels (A-group pixels) or not.

The edge determination section 25 determines the existence or nonexistence of an edge based on the level difference between captured image signals of the B-group pixels on which the narrow filters r, g, b are stacked. The edge determination section 26 determines the existence or nonexistence of an edge based on the level difference between captured image signals of the A-group pixels on which the wide filters R, G, b are stacked.

Figure 8:
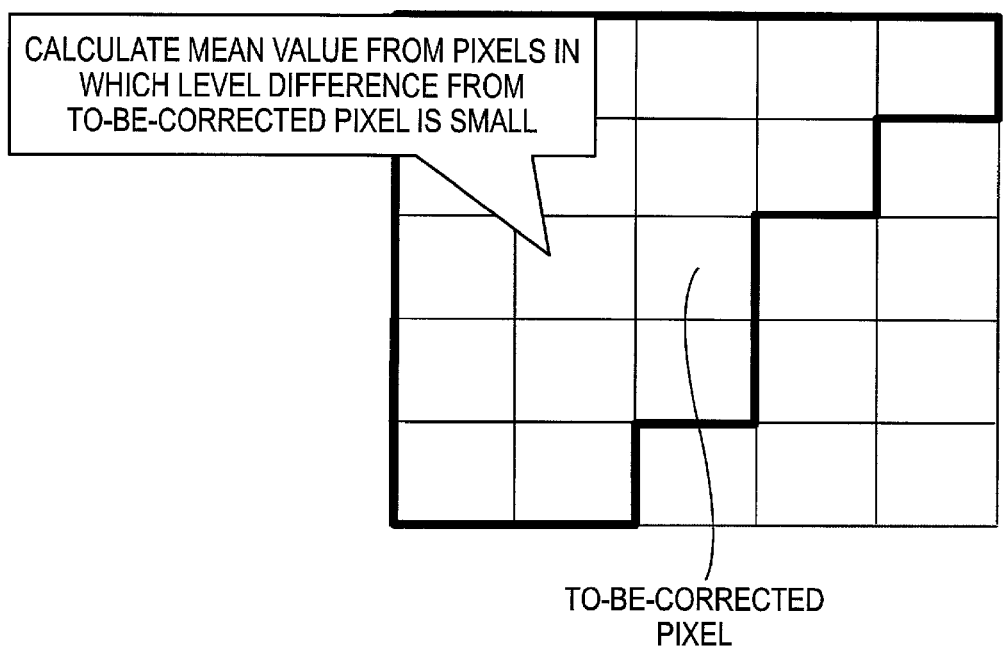
FIG. 8 is a view illustrating edge determination on an image.

As described above, the mean value calculation circuits 17, 18 use the mean value of same-color pixels in the periphery of the to-be-corrected pixel. When an edge portion is included in the same-color pixels in the periphery of the to-be-corrected pixel, however, a pixel value in which the level difference is large with respect to other pixel values enters the mean value, thereby causing a possibility that the correction is erroneously performed. Therefore, the edge determination sections 25, 26 determine the existence or nonexistence of an edge, and the mean value calculation circuits 17, 18 calculate mean values of pixels in which, as shown in FIG. 8, edge portions that are determined to include an edge are excluded. More specifically, FIG. 8 shows an example in which it is determined that an edge is included in the lower right portion which is not enclosed by the thick line. While excluding the lower right portion which is not enclosed by the thick line, the mean value calculation circuits 17, 18 calculate mean values by using captured image signals of the remaining pixels (the pixels in the region enclosed by the thick line).

Figure 9:
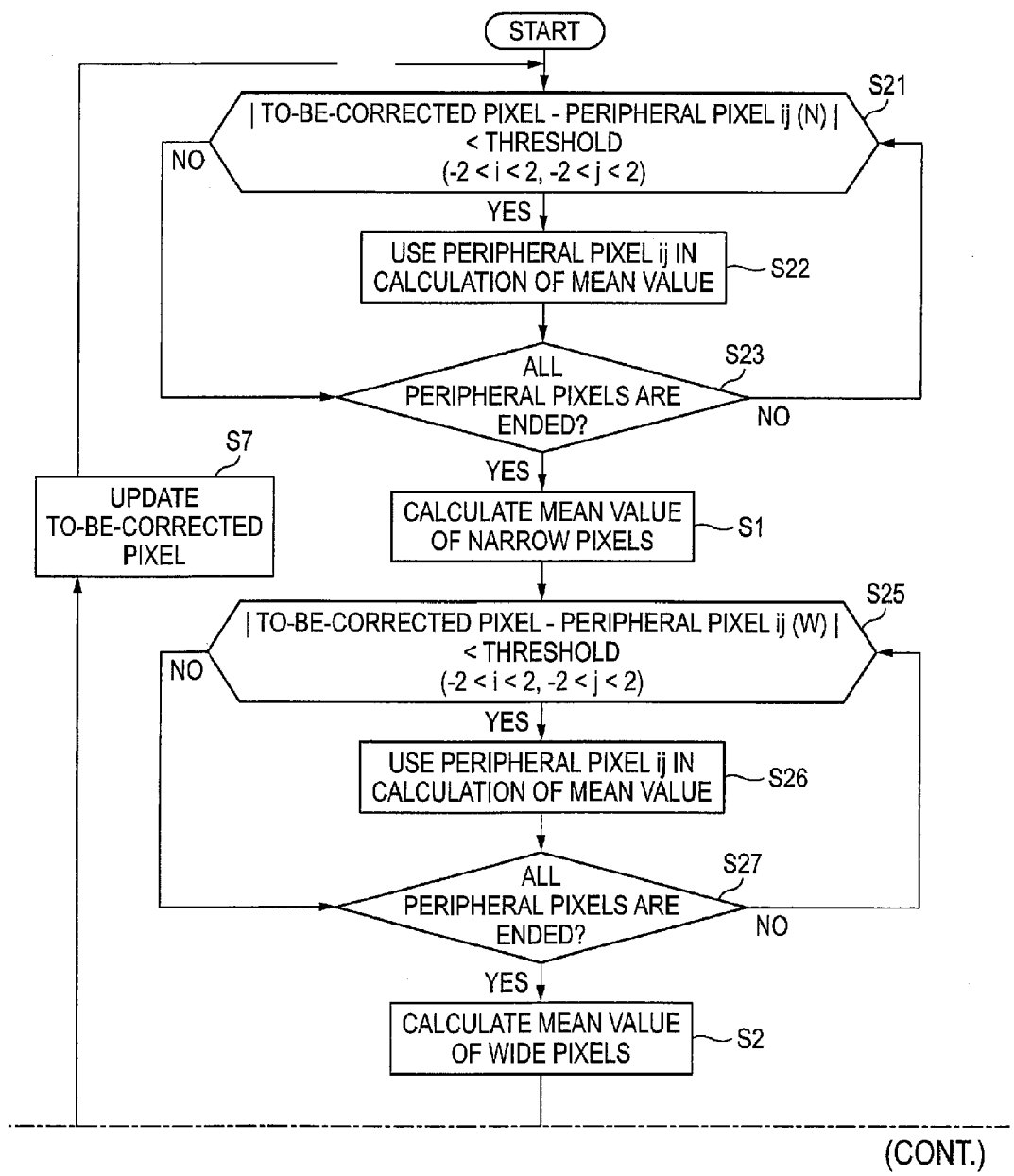
FIG. 9 is a flowchart showing the procedure of captured image processing in the third embodiment of the invention.

FIG. 9 is a flowchart showing the procedure of captured image processing in the third embodiment. The flowchart of FIG. 9 is different from that of FIG. 4 in that steps S21, S22, and S23 are disposed in front of step S1, and that steps S25, S26, and S27 are disposed between step S1 and step S2, and identical with the flowchart of FIG. 4 in the other points. Hereinafter, therefore, only different points will be described.

In step S21, it is determined whether the level difference between the captured image signal of the to-be-corrected pixel and captured image signals of pixels (narrow pixels) in the periphery of the determination object is smaller than a threshold or not. If the level difference is smaller than the threshold (Yes in step S21), the pixels in the periphery of the determination object are flagged as pixels which are to be used in calculation of a mean value (step S22), and the process then proceeds to step S23.

If, in the result of the determination of step S21, the level difference is equal to or larger than the threshold (No in step S21), the process similarly proceeds to step S23. Then, it is determined whether the determination of step S21 is performed on all of the periphery pixels or not (step S23). If the determination of step S21 is not ended with respect to all of the periphery pixels (No in step S23), the periphery pixel of the determination object is changed, and the process returns to step S21. By contrast, if the determination of step S21 is ended with respect to all of the periphery pixels (Yes in step S23), the process proceeds to step S1. In the mean value calculation process of step S1, the mean value of the periphery pixels in which a flag is set in step S22 is calculated.

Basic processes of S25, S26, and S27 are identical with those of steps S21, S22, and S23, respectively, but different in that the periphery pixels are wide pixels.

According to the embodiment, an edge portion in an image is determined, and the mean value is calculated while excluding the edge portion. Therefore, erroneous correction caused by an edge portion in an image can be reduced.

Figure 10:
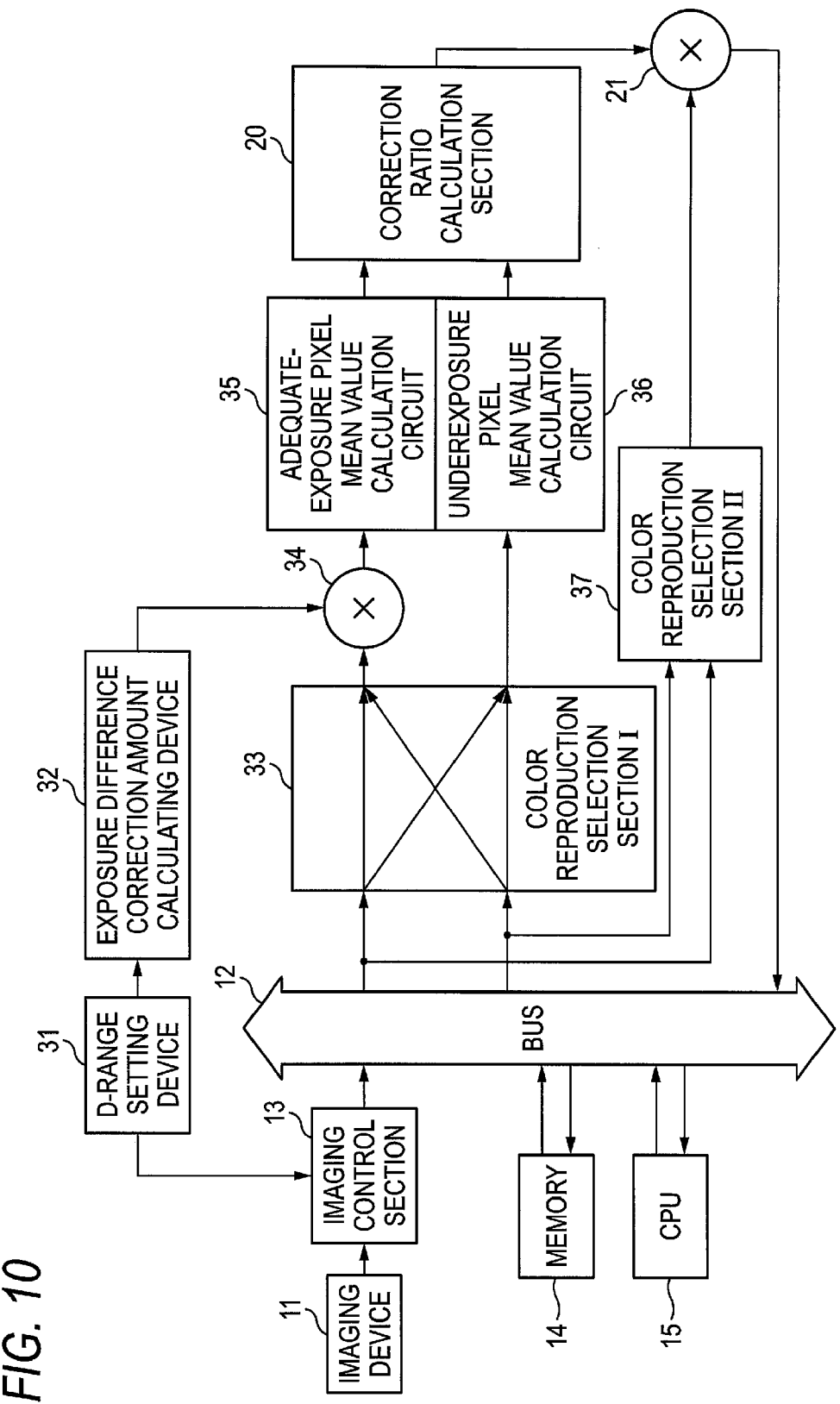
FIG. 10 is a functional block diagram of an imaging apparatus of a fourth embodiment of the invention.

FIG. 10 is a functional block diagram of an imaging apparatus 50 of a fourth embodiment of the invention. The imaging apparatus 50 of the embodiment is an imaging apparatus which can combine a natural color image captured by the A-group pixels on which the wide filters R, G, B are mounted, with a vivid color image captured by the B-group pixels on which the narrow filters r, g, b are mounted, thereby producing one image having a wide dynamic range.

In the case where an image having a wide dynamic range is to be produced, addition of two or narrow and wide pixels which are of the same color, and which are adjacent to each other is performed. When the level difference between narrow and wide pixels due to the spectral sensitivity ratio is not adequately corrected, however, an unnatural image is produced by the combination.

Similarly with the imaging apparatus 10 of FIG. 1, the imaging apparatus 50 of the embodiment includes the solid-state imaging device 11, the bus 12, the imaging control section 13, the memory 14, the CPU 15, the correction ratio calculation section 20, and the multiplier 21. The imaging apparatus 50 further includes a D (dynamic) range setting device 31 which controls the imaging control section 13, and an exposure difference correction amount calculating device 32 which is controlled by the D-range setting device 31.

The imaging apparatus 50 further includes: a first color reproduction selection section (I) 33; a multiplier 34; an adequate-exposure pixel mean value calculation circuit 35; an underexposure pixel mean value calculation circuit 36; and a second color reproduction selection section (II) 37. The first color reproduction selection section (I) 33 receives the captured image signal of the narrow pixels, and that of the wide pixels, and selects one of the signals. The multiplier 34 multiplies one of the captured image signal of the narrow pixels, and that of the wide pixels which is selected by the color reproduction selection section 33, by an output signal of the exposure difference correction amount calculating device 32. The adequate-exposure pixel mean value calculation circuit 35 calculates a mean value of an output signal the multiplier 34, as a mean value of adequate-exposure pixels. The underexposure pixel mean value calculation circuit 36 calculates a mean value of the other of the captured image signal of the narrow pixels, and that of the wide pixels, as a mean value of underexposure pixels. The second color reproduction selection section (II) 37 selects one of the captured image signals of the narrow and wide pixels which are received from the bus 12, and outputs the selected signal to the multiplier 21. The outputs of the mean value calculation circuits 35, 36 are received by the correction ratio calculation section 20, and the correction ratio is calculated, and then output to the multiplier 21.

Figure 11:
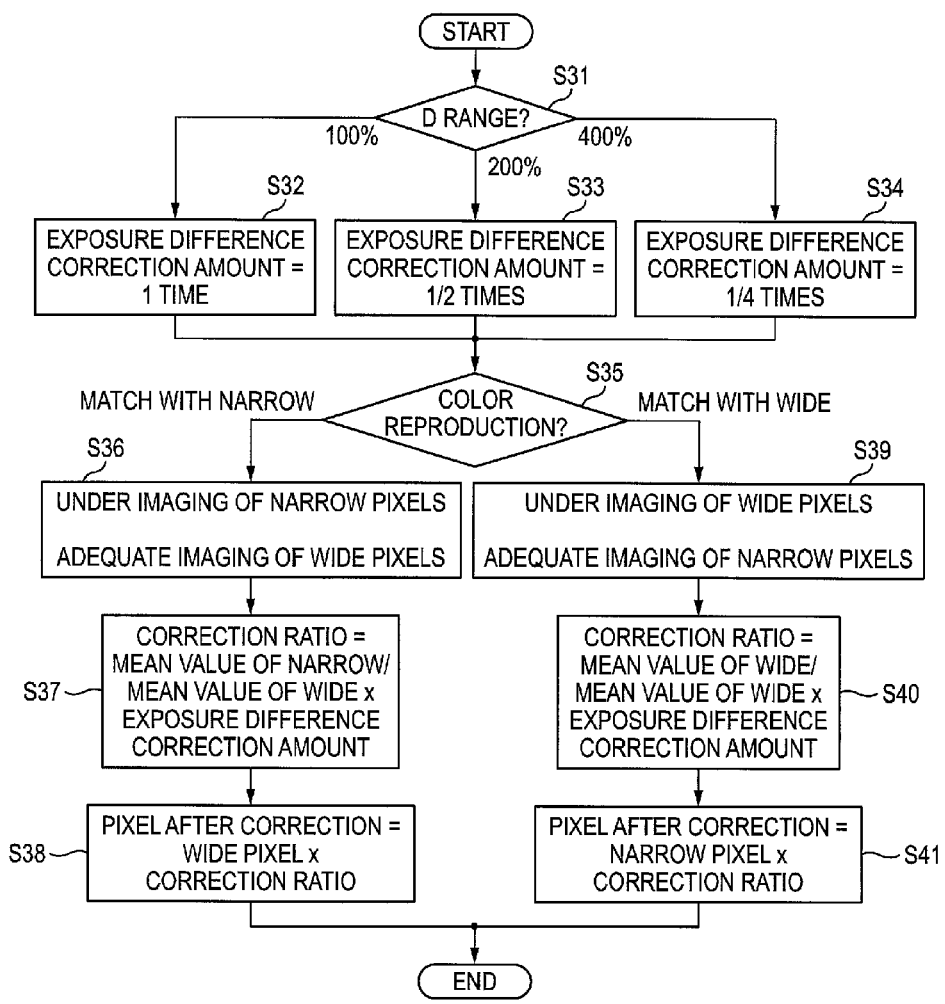
FIG. 11 is a flowchart showing the procedure of captured image processing in the fourth embodiment of the invention.

FIG. 11 is a flowchart showing the process procedure of a captured image processing program which is executed in the imaging apparatus 50. First, it is determined whether a D-range which is set by the user, or which is automatically set by the imaging apparatus 50 is 100%, 200%, or 400% (step S31).

If the D-range is 100%, the process proceeds to step S32 to set exposure difference correction amount=1 time. If the D-range is 200%, the process proceeds to step S33 to set exposure difference correction amount=½ times. If the D-range is 400%, the process proceeds to step S34 to set exposure difference correction amount=¼ times.

The exposure difference correction amount is the difference of exposure times. When the exposure time of the B-group pixels is set to be identical with that of the A-group pixels, the D-range is 100%. When the exposure time of one of the pixel groups is set to be ½ of that of the other pixel group, the D-range is 200%. When the exposure time of one of the pixel groups is set to be ¼ of that of the other pixel group, the D-range is 400%.

The determination of which one of the pixel groups is made shorter in exposure time is performed depending whether the color reproduction is on the wide side (natural color tone) or on the narrow side (vivid color tone). Hereinafter, pixels belonging to a pixel group, i.e., the A-group pixels or the B-group pixels in which the exposure time is set to be shorter than that in the other pixel group are referred to as underexposure pixels, and imaging which is performed while the exposure time is set to be short is referred to as underexposure imaging. Hereinafter, pixels belonging to a pixel group in which the exposure time is not set to be short are referred to as adequate-exposure pixels, and imaging under such conditions is referred to as adequate-exposure imaging.

After steps S32, S33, and S34, the process proceeds to step S35 to determine whether the color reproduction is on the narrow side (the side where a vivid color tone is obtained) or on the wide side (the side where a natural color tone is obtained). In the case where the color reproduction is set to the narrow side (the side where the color tone is vivid), the process proceeds to step S36, the narrow pixels (B-group pixels) which are on the side of the color reproduction are subjected to underexposure imaging, and the wide pixels (A-group pixels) are subjected to adequate imaging. These imaging processes are simultaneously performed, and underexposure imaging is conducted during the exposure time when adequate imaging is conducted.

In step S37, similarly in steps S1 and S2 in FIG. 4, the mean value of captured image signals of a predetermined number of narrow pixels of the same color in the periphery of a to-be-corrected pixel is obtained, and that of captured image signals of a predetermined number of wide pixels of the same color in the periphery of the to-be-corrected pixel is obtained. Then, the correction ratio is obtained as:

correction ratio=[mean value of narrow pixels]/[mean value of wide pixels]×exposure difference correction amount.

In step S38, the captured image signal of the to-be-corrected pixel (in this case, a wide pixel) is multiplied by the correction ratio, the captured image signal of the wide pixel is matched with the spectral sensitivity of a narrow pixel, also the exposure difference (the difference in exposure time) is matched, and then the process is ended. Of course, the above process is performed on all to-be-corrected pixels, but the illustration of steps S6 and S7 in FIG. 4 is omitted in the flowchart of FIG. 11. Steps S6 and S7 may be sequentially disposed after step S38, and the return destination of step S7 is set to step S37.

In the case where, in step S35, the color reproduction is set to the wide side (the side where the color tone is natural), the process proceeds from step S35 to step S36. In this case, the wide pixels (A-group pixels) which are on the side of the color reproduction are subjected to underexposure imaging, and the narrow pixels (B-group pixels) are subjected to adequate imaging.

In step S40, the mean value of captured image signals of a predetermined number of narrow pixels of the same color in the periphery of the to-be-corrected pixel is obtained, and that of captured image signals of a predetermined number of wide pixels of the same color in the periphery of the to-be-corrected pixel is obtained. Then, the correction ratio is obtained as:

correction ratio=[mean value of wide pixels]/[mean value of narrow pixels]×exposure difference correction amount.

In step S41, the captured image signal of the to-be-corrected pixel (in this case, a narrow pixel) is multiplied by the correction ratio, the captured image signal of the narrow pixel is matched with the spectral sensitivity of a wide pixel, also the exposure difference (the difference in exposure time) is matched, and then the process is ended. Of course, the above process is performed on all to-be-corrected pixels.

In step S36 and step S39 in FIG. 11, Under imaging and Adequate imaging are written. In the case where the D-range is 100%, however, the exposure time of a narrow pixel is equal to that of a wide pixel. Therefore, imaging is performed without distinguishing between "under" and "adequate".

The above-described program for processing a captured image can be executed not only in the case where it is incorporated in an imaging apparatus, but also in an external personal computer. It can be used in the case where one high-definition color image is produced by combining two color images captured by the imaging apparatus of the embodiment, and in the case where a color image having a wide dynamic range is produced by combination. The program for processing a captured image may be stored in a recording medium such as a hard disk or a ROM, and, when it is to be executed by a CPU or a processor, read out into a RAM or the like. Alternatively, the program for processing a captured image may be stored on a recording medium such as a CD-ROM.

Figure 12:
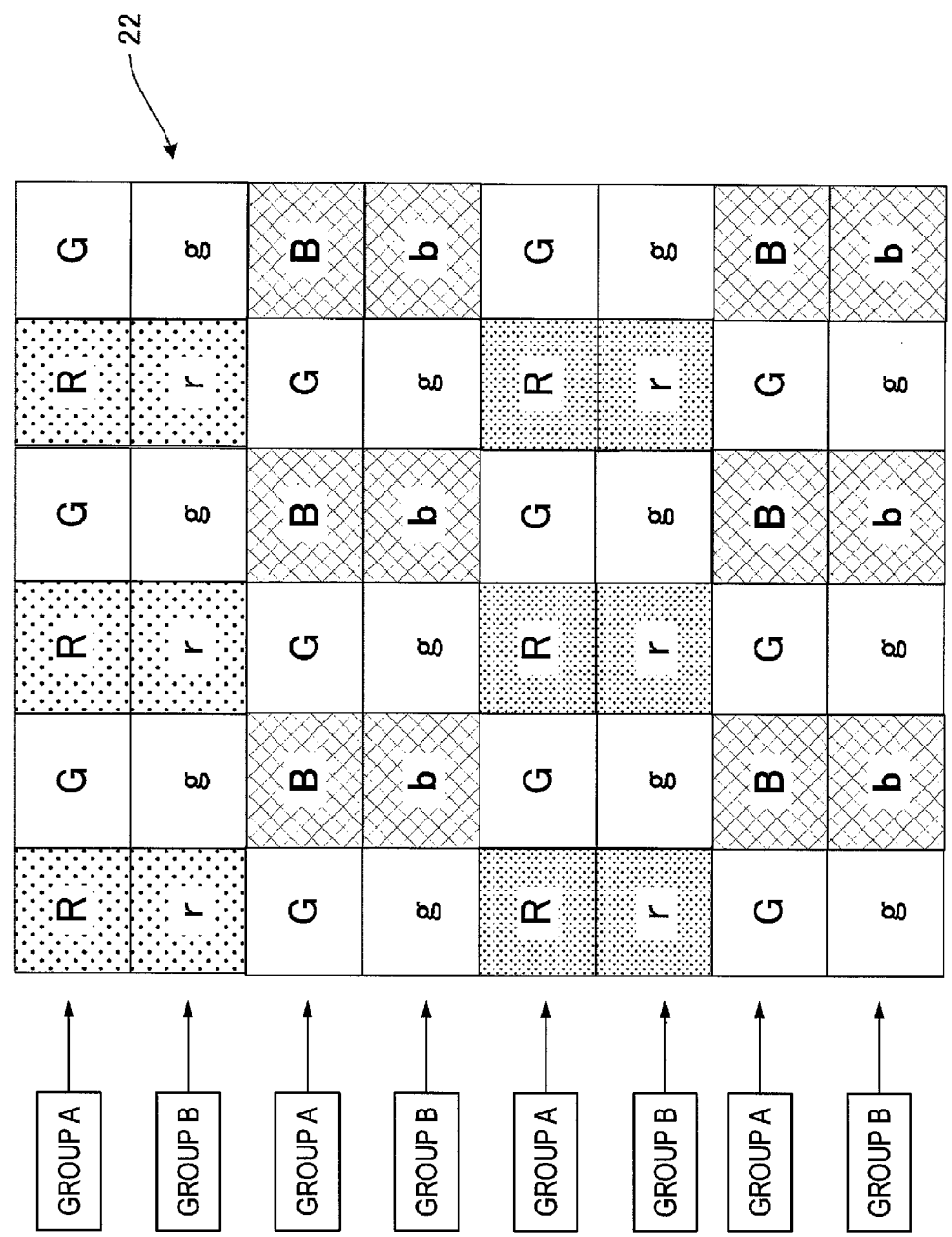
FIG. 12 is a view of a color filter arrangement in a solid-state imaging device an embodiment which is different from that of FIG. 2.

The solid-state imaging device of the embodiment has been described as a solid-state imaging device in which pixels are arranged in a checkered pattern as shown in FIG. 2. The pixel arrangement is not limited to the embodiment. As shown in FIG. 12, for example, all pixels may be arranged in a square lattice (illustrated as a color filter arrangement). In the solid-state imaging device 22 of FIG. 12, color filters of the three primary colors are Bayer-arranged in the pixels (A-group pixels) of the odd rows, and color filters of the three primary colors are Bayer-arranged also in the pixels (B-group pixels) of the even rows.

Also in the solid-state imaging device 22 of the embodiment, wide color filters R, G, B are stacked on the A-group pixels, narrow color filters r, g, b are stacked on the B-group pixels, and a natural color image of an object, and a vivid color image of the object can be simultaneously captured by one imaging operation.

In the above-described embodiments, the solid-state imaging device in which the color filters that allow a natural color image to be captured, and those that allow a vivid color image to be captured are mounted has been exemplarily described. However, the image processing methods of the above-described embodiments are not limited to such filters, and may be applied to captured images of a solid-state imaging device which can capture two kinds of color images having different color tones.

In the above-described embodiments of image processing, the color filters of the three primary colors have been exemplarily described. However, the methods can be similarly applied also to complementary color filters (color filters in which a respective one of the three primary colors is omitted). The above-described image processing methods can be applied even when the narrow spectral sensitivities are not completely inside the wide spectral sensitivities.

The narrow/wide relationships with respect to complementary color filters are as follows. The complementary color of red (R) is cyan (B+G), that of blue (B) is yellow (G+R), and that of green (G) is magenta (B+R). Here, the narrow/wide relationship of cyan is as follows. Namely, B which constitutes wide cyan, and B which constitutes narrow cyan have a narrow/wide relationship, and also G which constitutes wide cyan, and G which constitutes narrow cyan have a narrow/wide relationship.

The same is applicable to the other colors or yellow and magenta. The wavelength range of the half-value widths with respect to the spectral sensitivities of G and R constituting narrow yellow is inside that of the half-value widths with respect to the spectral sensitivities of G and R constituting wide yellow. Furthermore, the wavelength range of the half-value widths with respect to the spectral sensitivities of B and R constituting narrow magenta is inside that of the half-value widths with respect to the spectral sensitivities of B and R constituting wide magenta.

Moreover, the description has been made on the assumption that the pixels have the same area. When the areas of pixels in each of the groups are equal to one another within an error range, it is not necessary that the areas of the A-group pixels and those of the B-group pixels are equal to each other within an error range. The above-described image processing methods can be applied even when the A-group pixels and the B-group pixels are not equal in area to each other.

A described imaging apparatus of the embodiments comprises: a solid-state imaging device including: a plurality of pixels which are arranged and formed in a two-dimensional array in a semiconductor substrate; a plurality of color filters of a first color which are arranged and stacked in accordance with a predetermined rule on a first pixel group that includes one of odd rows and even rows of the pixels; and a plurality of color filters of a second color which are arranged and stacked in accordance with a predetermined rule on a second pixel group that includes the other one of the odd rows and the even rows, the color filters of the second color being different in spectral sensitivity from the plurality of color filters of the first color; and an image process section which obtains a level difference between captured image signals of the pixels of the first pixel group and captured image signals of the pixels of the second pixel group, the level difference being due to a spectral sensitivity difference between the plurality of color filters including the first color and the plurality of color filters including the second color, and which combines a first captured image that is obtained from the first pixel group by correcting the level difference, with a second captured image that is obtained from the second pixel group.

Also, a method of processing a captured image which processes an image captured by a solid-state imaging device of the embodiments comprises: a plurality of pixels which are arranged and formed in a two-dimensional array in a semiconductor substrate; a plurality of color filters of a first color which are arranged and stacked in accordance with a predetermined rule on a first pixel group that includes one of odd rows and even rows of the pixels; and a plurality of color filters of a second color which are arranged and stacked in accordance with a predetermined rule on a second pixel group that includes the other one of the odd rows and the even rows, the color filters of the second color being different in spectral sensitivity from the plurality of color filters of the first color, in which the method comprise: obtaining a level difference between captured image signals of the pixels of the first pixel group and captured image signals of the pixels of the second pixel group, the level difference being due to a spectral sensitivity difference between the plurality of color filters including the first color and the plurality of color filters including the second color; correcting the level difference; and combining a first captured image that is obtained from the first pixel group, and a second captured image that is obtained from the second pixel group with each other.

Also, in the imaging apparatus and the method of processing a captured image of the embodiments, the image process section obtains the level difference from a first mean value which is a mean value of the captured image signals of a predetermined number of pixels that are in a periphery of a pixel that is a correction subject, and that belong to the first pixel group, and a second mean value which is a mean value of the captured image signals of a predetermined number of pixels that are in a periphery of the pixel that is the correction subject, and that belong to the second pixel group, and corrects the level difference.

Also, in the imaging apparatus and the method of processing a captured image of the embodiments, the image process section corrects the level difference by: setting a ratio of the first mean value and the second mean value, as a correction ratio; and multiplying the captured image signal of the pixel that is the correction subject, by the correction ratio.

Also, in the imaging apparatus and the method of processing a captured image of the embodiments, when the correction ratio exceeds a preset upper limit value, the image process section uses the upper limit value as the correction ratio.

Also, in the imaging apparatus and the method of processing a captured image of the embodiments, the image process section determines whether an image of an edge portion indicating a contour portion of an object is contained in the first and second captured images or not, and obtains the first mean value and the second mean value while excluding the edge portion.

Also, in the imaging apparatus and the method of processing a captured image of the embodiments, the apparatus further includes an imaging control section which performs imaging by the first pixel group, and imaging by the second pixel group while producing an exposure difference, and the image process section obtains the level difference, corrects the captured image signals of the pixels of one pixel group of the first pixel group and the second pixel group, on the basis of the level difference and the exposure difference, and combines the corrected captured image signals with the captured image signals of the pixels of another pixel group, thereby producing a combined image having a wide dynamic range.

Also, in the imaging apparatus and the method of processing a captured image of the embodiments, light receiving areas of the pixels of the first pixel group, and light receiving areas of the pixels of the second pixel group are identical with each other within an error range.

Also, in the imaging apparatus and the method of processing a captured image of the embodiments, in a full-width at half maximum of spectral sensitivities of colors of the plurality of color filters including the first color, a full-width at half maximum of spectral sensitivities of corresponding colors of the plurality of color filters including the second color is.

Also, in the imaging apparatus and the method of processing a captured image of the embodiments, a ratio of a peak value of spectral sensitivities of colors of the plurality of color filters including the first color, and a peak value of spectral sensitivities of colors of the plurality of color filters including the second color is within a range of 0.9 to 1.1.

Also, in the imaging apparatus and the method of processing a captured image of the embodiments, the plurality of color filters including the first color are color filters of three primary colors, and the plurality of color filters including the second color are color filters of the three primary colors.

Also, in the imaging apparatus and the method of processing a captured image of the embodiments, the plurality of color filters configured by the first color are complementary color filters, and the plurality of color filters configured by the second color are complementary color filters.

Also, in the imaging apparatus and the method of processing a captured image of the embodiments, a first captured image due to the first pixel group is processed to produce a natural color image of an object, and a second captured image due to the second pixel group is processed to produce a vivid color image of the object.

Also, a program for processing a captured image of the embodiments comprises: a step of executing one of the methods of processing the captured image.

According to the above-described embodiments, it is possible to simultaneously capture two kinds of color images having different color tones (for example, a natural color image and a vivid color image), and the two kinds of color images can be combined with each other without producing a feeling of strangeness to produce a high-definition image or an image having a wide dynamic range.

INDUSTRIAL APPLICABILITY

The imaging apparatus and the like of the invention are equipped with a novel solid-state imaging device, can simultaneously capture two kinds of object color images having different color tones, and can combine them to produce a high-definition object image or an image having a wide dynamic range. Therefore, they are useful when they are applied to a wide variety of imaging apparatuses such as a digital still camera, a digital video camera, a camera-equipped electronic device such as, a camera-equipped mobile telephone, a PDA, or a notebook computer, and an endoscope.

Although the invention has been described in detail and with reference to the specific embodiments, it is obvious to those skilled in the art that various changes and modifications can be made without departing from the spirit and scope of the invention.

The application is based on Japanese Patent Application No. 2010-097367 filed Apr. 20, 2010, and its disclosure is incorporated herein by reference.

REFERENCE SIGNS LIST 10, 20, 30, 40 imaging apparatus
11, 22 solid-state imaging device
15 CPU
17 narrow-spectral pixel mean value calculation circuit
18 wide-spectral pixel mean value calculation circuit
19, 33, 37 color reproduction selection section
20 correction ratio calculation section
21 multiplier
23 correction ratio suppression section
25 narrow pixel edge determination section
26 wide pixel edge determination section
31 D-range setting device
32 exposure difference correction amount calculating device
35 adequate-exposure pixel mean value calculation circuit
36 underexposure pixel mean value calculation circuit

The invention claimed is:

1. An imaging apparatus comprising:
a solid-state imaging device including:
a plurality of pixels which are arranged and formed in a two-dimensional array in a semiconductor substrate;
a plurality of color filters of a first color which are arranged and stacked in accordance with a predetermined rule on a first pixel group that includes one of odd rows and even rows of the pixels; and
a plurality of color filters of a second color which are arranged and stacked in accordance with a predetermined rule on a second pixel group that includes the other one of the odd rows and the even rows, the color filters of the second color being different in spectral sensitivity from the plurality of color filters of the first color; and
an image process section which obtains a level difference between captured image signals of the pixels of the first pixel group and captured image signals of the pixels of the second pixel group, the level difference being due to a spectral sensitivity difference between the plurality of color filters including the first color and the plurality of color filters including the second color, and which combines a first captured image that is obtained from the first pixel group by correcting the level difference, with a second captured image that is obtained from the second pixel group, wherein
the image process section obtains the level difference from a first mean value which is a mean value of the captured image signals of a predetermined number of pixels that are in a periphery of a pixel that is a correction subject, and that belong to the first pixel group, and a second mean value which is a mean value of the captured image signals of a predetermined number of pixels that are in a periphery of the pixel that is the correction subject, and that belong to the second pixel group, and corrects the level difference, and
the image process section determines whether an image of an edge portion indicating a contour portion of an object is contained in the first and second captured images or not, and obtains the first mean value and the second mean value while excluding the edge portion.

2. The imaging apparatus according to claim 1, wherein the image process section corrects the level difference by: setting a ratio of the first mean value and the second mean value, as a correction ratio; and multiplying the captured image signal of the pixel that is the correction subject, by the correction ratio.

3. The imaging apparatus according to claim 2, wherein when the correction ratio exceeds a preset upper limit value, the image process section uses the upper limit value as the correction ratio.

4. The imaging apparatus according to claim 1, wherein the apparatus further includes an imaging control section which performs imaging by the first pixel group, and imaging by the second pixel group while producing an exposure difference, and
the image process section obtains the level difference, corrects the captured image signals of the pixels of one pixel group of the first pixel group and the second pixel group, on the basis of the level difference and the exposure difference, and combines the corrected captured image signals with the captured image signals of the pixels of another pixel group, thereby producing a combined image having a wide dynamic range.

5. The imaging apparatus according to claim 1, wherein light receiving areas of the pixels of the first pixel group, and light receiving areas of the pixels of the second pixel group are identical with each other within an error range.

6. The imaging apparatus according to claim 1, wherein in a full-width at half maximum of spectral sensitivities of colors of the plurality of color filters including the first color, a full-width at half maximum of spectral sensitivities of corresponding colors of the plurality of color filters including the second color is.

7. The imaging apparatus according to claim 1, wherein a ratio of a peak value of spectral sensitivities of colors of the plurality of color filters including the first color, and a peak value of spectral sensitivities of colors of the plurality of color filters including the second color is within a range of 0.9 to 1.1.

8. The imaging apparatus according to claim 1, wherein the plurality of color filters including the first color are color filters of three primary colors, and the plurality of color filters including the second color are color filters of the three primary colors.

9. The imaging apparatus according to claim 1, wherein the plurality of color filters configured by the first color are complementary color filters, and the plurality of color filters configured by the second color are complementary color filters.

10. A method of processing a captured image which processes an image captured by a solid-state imaging device comprising:
a plurality of pixels which are arranged and formed in a two-dimensional array in a semiconductor substrate;
a plurality of color filters of a first color which are arranged and stacked in accordance with a predetermined rule on a first pixel group that includes one of odd rows and even rows of the pixels; and
a plurality of color filters of a second color which are arranged and stacked in accordance with a predetermined rule on a second pixel group that includes the other one of the odd rows and the even rows, the color filters of the second color being different in spectral sensitivity from the plurality of color filters of the first color, wherein,
the method comprise:
obtaining a level difference between captured image signals of the pixels of the first pixel group and captured image signals of the pixels of the second pixel group, the level difference being due to a spectral sensitivity difference between the plurality of color filters including the first color and the plurality of color filters including the second color;
correcting the level difference; and
combining a first captured image that is obtained from the first pixel group, and a second captured image that is obtained from the second pixel group with each other, wherein
the level difference is obtained from a first mean value which is a mean value of the captured image signals of a predetermined number of pixels that are in a periphery of a pixel that is a correction subject, and that belong to the first pixel group, and a second mean value which is a mean value of the captured image signals of a predetermined number of pixels that are in a periphery of the pixel that is the correction subject, and that belong to the second pixel group, and the level difference is corrected, and
the method further includes a process of determining whether an image of an edge portion indicating a contour portion of an object is contained in the first and second captured images or not, and
the first mean value and the second mean value are obtained while excluding the edge portion.

11. The method of processing a captured image according to claim 10, wherein
the level difference is corrected by: setting a ratio of the first mean value and the second mean value, as a correction ratio; and multiplying the captured image signal of the pixel that is the correction subject, by the correction ratio.

12. The method of processing a captured image according to claim 11, wherein
the method further includes, when the correction ratio exceeds a preset upper limit value, using the upper limit value as the correction ratio.

13. The method of processing a captured image according to claim 10, wherein
when a captured image obtained by performing imaging by the first pixel group, and imaging by the second pixel group while producing an exposure difference is to be processed, the level difference is obtained, the captured image signals of the pixels of one pixel group of the first pixel group and the second pixel group are corrected based on the level difference and the exposure difference, and the corrected captured image signals and the captured image signals of the pixels of another pixel group are combined with each other, thereby producing a combined image having a wide dynamic range.

14. The method of processing a captured image according to claim 10, wherein
light receiving areas of the pixels of the first pixel group, and light receiving areas of the pixels of the second pixel group are identical with each other within an error range.

15. The method of processing a captured image according to claim 10, wherein
in a full-width at half maximum of spectral sensitivities of colors of the plurality of color filters including the first color, a full-width at half maximum of spectral sensitivities of corresponding colors of the plurality of color filters including the second color is.

16. The method of processing a captured image according to claim 10, wherein
a ratio of a peak value of spectral sensitivities of colors of the plurality of color filters including the first color, and a peak value of spectral sensitivities of colors of the plurality of color filters including the second color is within a range of 0.9 to 1.1.

17. The method of processing a captured image according to claim 10, wherein
the plurality of color filters including the first color are color filters of three primary colors, and the plurality of color filters including the second plural colors are color filters of the three primary colors.

18. The method of processing a captured image according to claim 10, wherein
the plurality of color filters including the first color are complementary color filters, and the plurality of color filters including the second color are complementary color filters.

19. The method of processing a captured image according to claim 15, wherein
a first captured image due to the first pixel group is processed to produce a natural color image of an object, and a second captured image due to the second pixel group is processed to produce a vivid color image of the object.

20. A non-transitory computer-readable recording medium, and which stores a program for causing a computer to execute a captured image process for processing an image captured by a solid-state imaging device including:

a plurality of pixels which are arranged and formed in a two-dimensional array in a semiconductor substrate;

a plurality of color filters of a first color which are arranged and stacked in accordance with a predetermined rule on a first pixel group that includes one of odd rows and even rows of the pixels; and a plurality of color filters of a second color which are arranged and stacked in accordance with a predetermined rule on a second pixel group that includes the other one of the odd rows and the even rows, the color filters of the second color being different in spectral sensitivity from the plurality of color filters of the first color, wherein, in the image process, obtaining a level difference between captured image signals of the pixels of the first pixel group and captured image signals of the pixels of the second pixel group, the level difference being due to a spectral sensitivity difference between the plurality of color filters including the first color and the plurality of color filters including the second color;

correcting the level difference; and combining a first captured image that is obtained from the first pixel group, and a second captured image that is obtained from the second pixel group with each other.

* * * * *